(12) United States Patent
Cao et al.

(10) Patent No.: US 6,337,884 B1
(45) Date of Patent: Jan. 8, 2002

(54) CIRCUITRY FOR ALLOWING TWO DRIVERS TO COMMUNICATE WITH TWO RECEIVERS USING ONE TRANSMISSION LINE

(75) Inventors: Tai Cao; Satyajit Dutta; Thai Quoc Nguyen; Thanh Doan Trinh; Lloyd Andre Walls, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/096,502

(22) Filed: Jun. 12, 1998

Related U.S. Application Data (63) Continuation of application No. 08/387,518, filed on Feb. 13, 1995, now Pat. No. 5,864,584.

(51) Int. Cl.[7] ................................................ H04B 3/00
(52) U.S. Cl. ...................................... 375/257; 375/288
(58) Field of Search ............................... 375/257, 244, 375/220, 288, 265; 370/211, 275, 294, 280; 379/399, 414

(56) References Cited

U.S. PATENT DOCUMENTS

| | | | |
|---|---|---|---|
| 3,267,459 A | 8/1966 | Chomicki et al. | |
| 3,832,494 A | 8/1974 | Seim et al. | 179/15 BA |
| 4,498,166 A | 2/1985 | Esposito | 370/9 |
| 4,595,923 A | 6/1986 | McFarland, Jr. | 340/825.52 |
| 4,916,657 A | 4/1990 | Morton | 364/900 |
| 5,034,964 A | 7/1991 | Khan et al. | 375/25 |
| 5,446,321 A | 8/1995 | Yoshino et al. | 326/57 |
| 5,469,430 A | 11/1995 | Guerin et al. | 370/37 |
| 5,856,980 A | * 1/1999 | Doyle | 371/5.1 |
| 5,929,896 A | * 7/1999 | Goodman et al. | 348/14 |

\* cited by examiner

*Primary Examiner*—Chi Pham
*Assistant Examiner*—Emmanuel Bayard
(74) *Attorney, Agent, or Firm*—Kelly K. Kordzik; Winstead Sechrest & Minick P.C.; Anthony V. S. England (57) ABSTRACT

The present invention allows for the simultaneous transmission of two digital signals from one integrated circuit to another. The two digital signals are encoded utilizing a voltage divider circuit and are then transmitted by one transmission line to the second integrated circuit chip. The second integrated circuit chip decodes the first digital signal and then utilizes this decoded digital signal to further decode the second digital signal.

17 Claims, 5 Drawing Sheets

CIRCUITRY FOR ALLOWING TWO DRIVERS TO COMMUNICATE WITH TWO RECEIVERS USING ONE TRANSMISSION LINE

This is a continuation of application Ser. No. 08/387,518 filed Feb. 13, 1995 now U.S. Pat. No. 5,864,584.

TECHNICAL FIELD OF THE INVENTION

The present invention relates in general to data communication, and in particular, to a system and method for permitting simultaneous communications between a plurality of drivers and a plurality of receivers using one transmission line.

BACKGROUND OF THE INVENTION

Prior art circuitry does not permit simultaneous unidirectional data communications between two separate integrated circuits ("chips") through the same transmission line. In other words, when communicating signals between circuitry implemented in separate chips, it is required that for each separate transmission of a signal, there be a separate transmission line and corresponding connection circuitry, or that time division multiplexing be utilized in order that two separate signals be transmitted on the same transmission line between two chips.

Naturally, to implement time division multiplexing, additional complex circuitry is required. As a result, traditional system designs have had to settle for implementing separate transmission lines in order to support data communications in a simultaneous manner. However, it is generally desired when designing circuitry (for example, for computer systems) that the circuitry be simplified as much as possible. Therefore, it is desired to reduce the number of transmission lines between chips, along with their corresponding connection circuitry (e.g., driver, receiver, chip pins and signal pads).

Thus, there is a need in the art for a circuit design that allows for the simultaneous transmission of separate data signals on one transmission line.

SUMMARY OF THE INVENTION

The foregoing need is satisfied by the present invention, which implements encoding circuitry for receiving two digital signals, which encodes the two digital signals into one signal to be transmitted via a transmission path to a decoding circuitry, which decodes the one signal into the two digital signals. One of the digital signals is decoded and then utilized to decode the other digital signal. Encoding of the digital signals is performed through the use of a voltage divider circuit coupled to the transmission line. Decoding of the digital signals is performed by decoding the first digital signal by comparing the transmitted signal to a reference voltage, and then utilizing this decoded signal to decode the second digital signal by comparing the first decoded digital signal to the original signal.

In an alternative embodiment, the encoding stage may utilize additional circuitry for placing a portion of the circuitry into a tri-state mode for the transmission of only one of the digital signals via the single transmission line.

In yet another alternative embodiment of the present invention, the two digital signals may originate within two separate integrated circuit chips, and are then combined for transmission over the single transmission line.

In yet another alternative embodiment of the present invention, two separate sets of receiving and decoding circuits may be utilized to receive the single transmitted signal on the single transmission line and decode this signal into its constituent parts in separate integrated circuit chips.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

In the following description, numerous specific details are set forth such as voltages or component values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
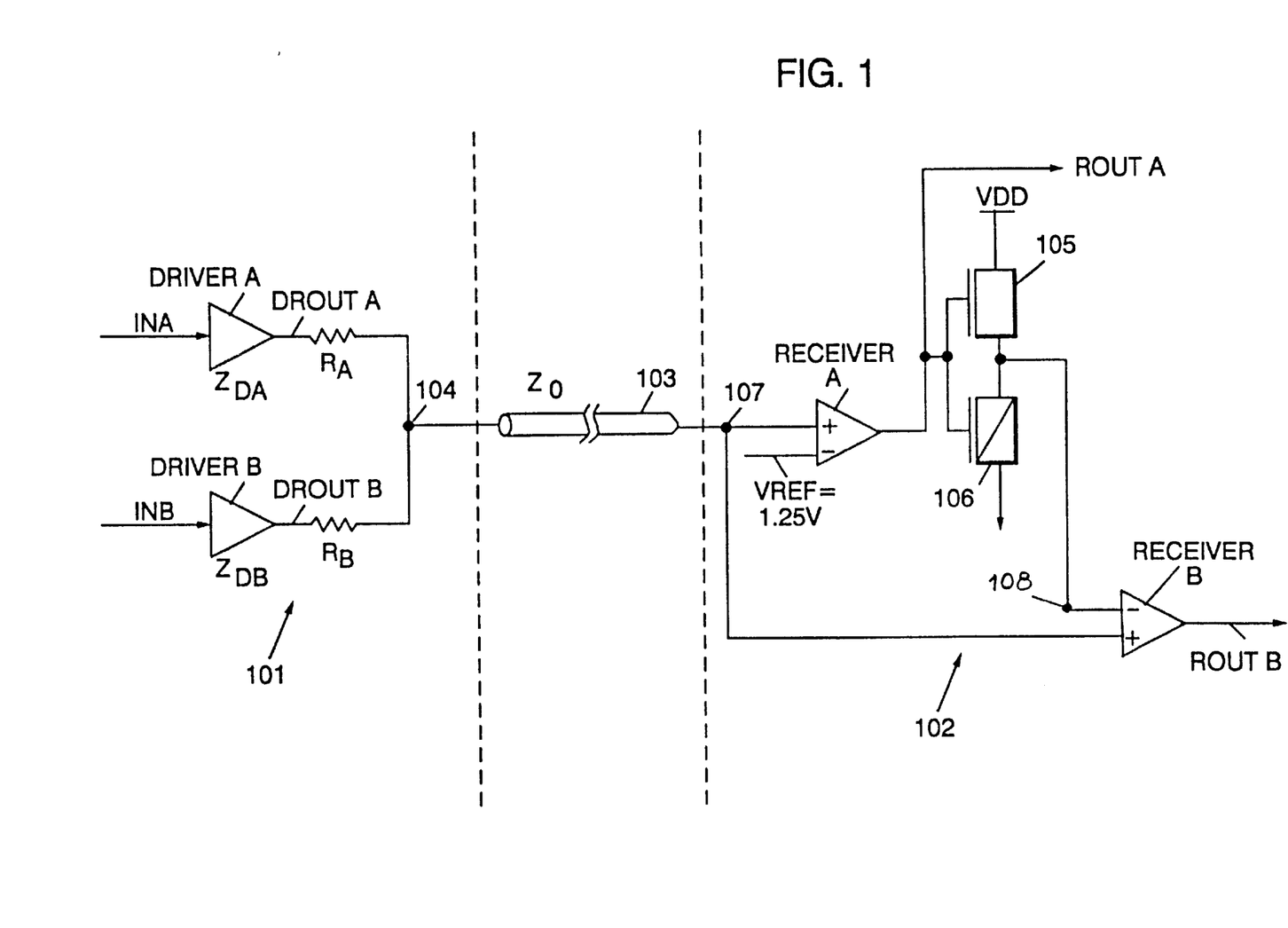
FIG. 1 illustrates a preferred embodiment of the present invention.

Referring to FIG. 1, there is illustrated a preferred embodiment of the present invention, which permits a simultaneous transmission of two separate digital signals to be communicated from chip 101 to chip 102. Chips 101 and 102 are preferably implemented with complementary metal-oxide semiconductor ("CMOS") circuitry, requiring a 2.5 volt supply for operation (VDD=2.5 volts). Chips 101 and 102 may be portions of an overall circuit design for a system such as a computer. In such a design, it may be necessary for the circuitry implemented in chip 101 to communicate with the circuitry implemented in chip 102. As a result, digital signals will have to be transmitted from chip 101 to chip 102. As discussed above, it is almost always desired within circuit design to limit the number and complexity of components required to implement a design. The present invention assists in this goal by enabling the transmissions of two separate and distinct digital signals from chip 101 to chip 102 on a single transmission line 103. The use of the single transmission line 103 eliminates the need for two separate transmission lines for the two distinct digital signals, and also the corresponding signal pads and chip pins on both chips 101 and 102.

In chip 101, Driver A receives the first digital signal on input line INA, while Driver B receives the other digital signal on input line INB. INA and INB are coupled to other various circuitry within chip 101. This circuitry within chip 101 requires that the two digital signals A and B be transmitted to circuitry in chip 102. Digital signals A and B are transmitted to chip 102 via transmission line 103, and are eventually decoded so that digital signal A is routed to circuitry in chip 102 via output line ROUTA, while digital signal B is routed to circuitry within chip 102 via line ROUTB. The circuitry illustrated in FIG. 1 ensures that digital signal A received on line INA is accurately transmitted to output line ROUTA and digital signal B received on line INB is accurately outputted on line ROUTB, while transmitting digital signals A and B from chip 101 to chip 102 via the single transmission line 103.

Digital signals A and B are driven by Drivers A and B through resistors $R_A$ and $R_B$, respectively, to the common node 104, which is coupled to transmission line 103. Node 104 may represent the chip pin and/or signal pad coupling chip 101 to transmission line 103. Such a connection may be a solder-ball connection, commonly referred to in the industry as a C4 connection.

Transmission line 103 is similarly coupled to the circuitry within chip 102 at node 107, which may also be a C4 connection. Node 107 is coupled to the positive input to Receiver A and the positive input to Receiver B (which are preferably differential amplifiers). The negative input to Receiver A is tied to a reference voltage VREF=1.25 volts. The output of Receiver A is coupled to a buffer circuit comprising N-type FET 105 and P-type FET 106 coupled in series. This buffer circuit is coupled to the negative input to Receiver B.

In order to properly transfer the digital signals from the circuitry in chip 101 to transmission line 103, it is necessary that the impedance of the parallel circuits in chip 101 match the impedance $Z_0$ of transmission line 103. Driver A has an impedance of $Z_{DA}$, while Driver B has an impedance of $Z_{DB}$. $Z_{DA}$, $Z_{DB}$, $R_A$ and $R_B$ are chosen such that: $(Z_{DA}+R_A)//(Z_{DB}+R_B)=Z_0$ and $(Z_{DA}+R_A)/(Z_{DB}+R_B)=\frac{1}{2}$ (approximately). If the impedances above are chosen to satisfy both of these equations, then there is a matching of impedances between the circuitry in chip 101 and the impedance $Z_0$ of transmission line 103, and a voltage divider is created so that voltages from VDD to ground are divided into three "nearly equal" compartments (four levels), in order to properly encode the digital signals when combined on the single transmission line 103. Typical values for these impedances are: $Z_{DA}+R_A=75$ ohms, $Z_{DB}+R_B=150$ ohms. These resistors may be located on-chip or off-chip.

The circuitry illustrated in FIG. 1 utilizes the reference voltage tied to Receiver A to decode digital signal A, and then uses digital signal A to decode digital signal B.

In this simultaneous unidirectional mode of operation, there are four sub-modes:

Mode 1—both Drivers A and B send a logical "1".

Mode 2—both Drivers A and B send a logical "0".

Mode 3—Driver A sends a logical "0" and Driver B sends a logical "1".

Mode 4—Driver A sends a logical "1" and Driver B sends a logical "0".

For each of these sub-modes, table 1 shows the voltage levels that would appear on the various nodes of the circuit illustrated in FIG. 1, assuming a supply voltage VDD equal to 2.5 volts.

TABLE 1

| | CHIP 101 | | | | CHIP 102 | | | | | | |
|---|---|---|---|---|---|---|---|---|---|---|---|
| Submode | DROUTA | DROUTB | Node 104 | XLINE XLINE | Node 107 | IN + A | IN − A | ROUTA | IN + B | Node 108 IN − B | ROUTB |
| 1 | 2.5 | 2.5 | 2.5 | 2.5 | 2.5 | 2.5 | 1.25 | 2.5 | 2.5 | 1.8 | 2.5 |
| 2 | 0.0 | 0.0 | 0.0 | 0.0 | 0.0 | 0.0 | 1.25 | 0.0 | 0.0 | 0.6 | 0.0 |
| 3 | 0.0 | 2.5 | 0.83 | 0.83 | 0.83 | 0.83 | 1.25 | 0.0 | 0.83 | 0.6 | 2.5 |
| 4 | 2.5 | 0.0 | 1.67 | 1.67 | 1.67 | 1.67 | 1.25 | 2.5 | 1.67 | 1.8 | 0.0 |

In submode 1, both Drivers A and B are transmitting a logical "1", which results in a voltage level at DROUTA and DROUTB of 2.5 volts. This 2.5 volts is also present at node 104 and along transmission line 103 and at node 107. In chip 102, this 2.5 volts is supplied to the positive input of Receiver A (IN+A), which is greater than the reference voltage VREF=1.25 volts, resulting in 2.5 volts being outputted onto ROUTA, as is desired since 2.5 volts, or a logical "1", is driven by Driver A in chip 101. This 2.5 volts is also supplied to the gate electrodes of devices 105 and 106 resulting in 2.5 volts minus a threshold voltage of 0.6 volts for device 105 supplied to the negative input at Receiver B (IN−B). Since this resulting voltage level of 1.8 volts is less than the 2.5 volts supplied to the positive input of Receiver B (IN+B) from node 107, Receiver B outputs 2.5 volts, or a logical "1", corresponding to the logical "1" driven by Driver B in chip 101.

In submode 2, logical "0s" are driven by both Drivers A and B. This 0.0 voltage is therefore also present at node 104, along transmission line 103 and node 107. Since the reference voltage of 1.25 volts is greater than 0.0 volts, Receiver A outputs a 0.0 voltage corresponding to a logical "0" onto line ROUTA. This 0.0 voltage is also supplied to the buffer circuit comprising devices 105 and 106, resulting in a voltage of 0.6 volts outputted into the negative input of Receiver B. Since this 0.6 volts is greater than the 0.0 volts supplied to the positive input of Receiver B, Receiver B outputs onto line ROUTB a 0.0 voltage, corresponding to the logical "0" intended to be transmitted from Driver B of chip 101 to Receiver B of chip 102.

In submode 3, a logical 0 is driven by Driver A while a logical "1" is driven by Driver B. This results in a voltage of 0.83 volts supplied to node 104, transmission line 103, and node 107.

Since 0.83 volts is less than the reference voltage VREF of 1.25 volts, Receiver A outputs a logical "0" onto line ROUTA, corresponding to the logical "0" driven by Driver A. This logical 0 results in a voltage of 0.6 volts supplied to the negative input of Receiver B, which is less than 0.83 volts supplied to the positive input of Receiver B from node 107. This causes Receiver B to output a logical "1" onto ROUTB, corresponding to the logical "1" driven by Driver B.

In submode 4, a logical "1" is driven by Driver A while a logical "0" is driven by Driver B. This results in a voltage of 1.67 volts, because of the voltage divider 5 circuit discussed above, at node 104, transmission line 103, and node 107. Since 1.67 volts is greater than 1.25 volts, Receiver A outputs a logical "1" on line ROUTA, corresponding to the logical "1" driven by Driver A. This 2.5 volts is also supplied to the gate electrodes of devices 105 and 106, resulting in the output from that buffer circuit of 1.8 volts supplied to the negative input of Receiver B. Since this 1.8 volts is greater than the 1.67 volts supplied to the positive input of Receiver B, Receiver B outputs a logical "0" on line ROUTB, corresponding to the logical "0" intended to be driven by Driver "B" in chip 101.

As may be easily seen from the discussion above with reference to FIG. 1 and Table 1, the circuit of a preferred embodiment of the present invention as illustrated in FIG. 1 allows Drivers A and B to transmit digital signals on one transmission line 103 to the circuitry in chip 102, which properly decodes these combined digital signals.

In a steady state during submodes 3 and 4, the current flowing through resistors $R_A$ and $R_B$ is given by: 2.5V/(75+ 150) ohms=11 milliamps. Taking this into consideration, the design of the circuitry should consider correct line widths, vias and contacts in order to make the circuit reliable.

Table 2 illustrates the condition when only Driver A is driving a digital signal and Receiver A properly decodes the signal and Driver B is tri-stated.

TABLE 2

| DRIVER A DRIVING | | RECEIVER A RECEIVING DATA | | |
|---|---|---|---|---|
| DROUTA | NODE 104 | IN + A | IN − A | ROUTA |
| 2.5 | 2.5 | 2.5 | 1.25 | 2.5 |
| 0.0 | 0.0 | 0.0 | 1.25 | 0.0 |

Table 3 illustrates the situation where Driver B is only driving a digital signal and Receiver B properly decodes this signal and Driver A is tri-stated.

TABLE 3

| DRIVER B DRIVING | | | RECEIVER A | | | RECEIVER B RECEIVING IN − B | | |
|---|---|---|---|---|---|---|---|---|
| DROUTB | NODE 104 | IN + A | IN − A | ROUTA | IN + B | Node 108 | ROUTB |
| 2.5 | 2.5 | 2.5 | 1.25 | 2.5 | 2.5 | 1.8 | 2.5 |
| 0.0 | 0.0 | 0.0 | 1.25 | 0.0 | 0.0 | 0.6 | 0.0 |

Figure 2:
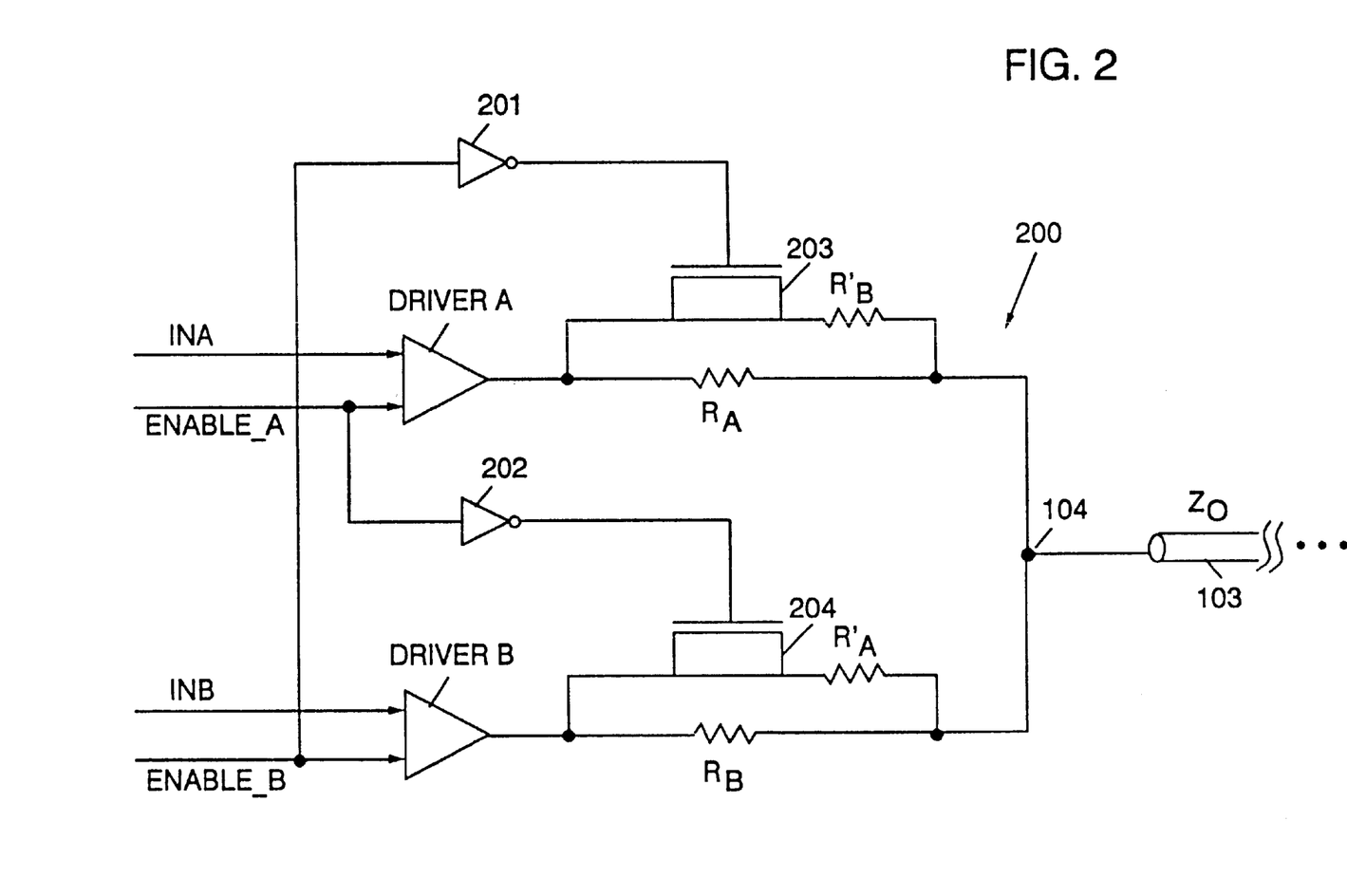
FIG. 2 illustrates an alternative embodiment of the present invention when one of two drivers is placed in a tri-state mode.

Referring next to FIG. 2, there is illustrated an alternative embodiment of the present invention for the situation where either Driver A or B may be disabled into a tri-state mode. In such a situation, when either Driver A or Driver B is disabled into a tri-state mode, there is implemented additional circuitry to insure that the proper impedance matching is provided between transmission line 103 and the remaining circuitry in chip 200. For example, if Driver B is disabled, or deactivated, by signal ENABLE_B switching to a "low" signal, this "low" signal is supplied to N-type FET 203 through inverter 201, turning on device 203. This results in Driver A transmitting digital signal A to node 104 through the parallel circuit comprising resistor RA and resistor $R'_B$. Resistor $R'_B$ corresponds to resistor $R_B$. As a result, the impedance $Z_0$ of transmission line 103 is still matched by the parallel combination of the resistor $R_A$ and $R'_B$, even though Driver B and its corresponding circuitry has been placed into a tri-state condition.

The same is true if Driver A is disabled and placed into a tri-state mode by the deactivation of signal ENABLE_A, which is supplied to N-type FET 204 through inverter 202. Resistance $R'_A$ corresponds to resistance $R_A$.

Figure 3:
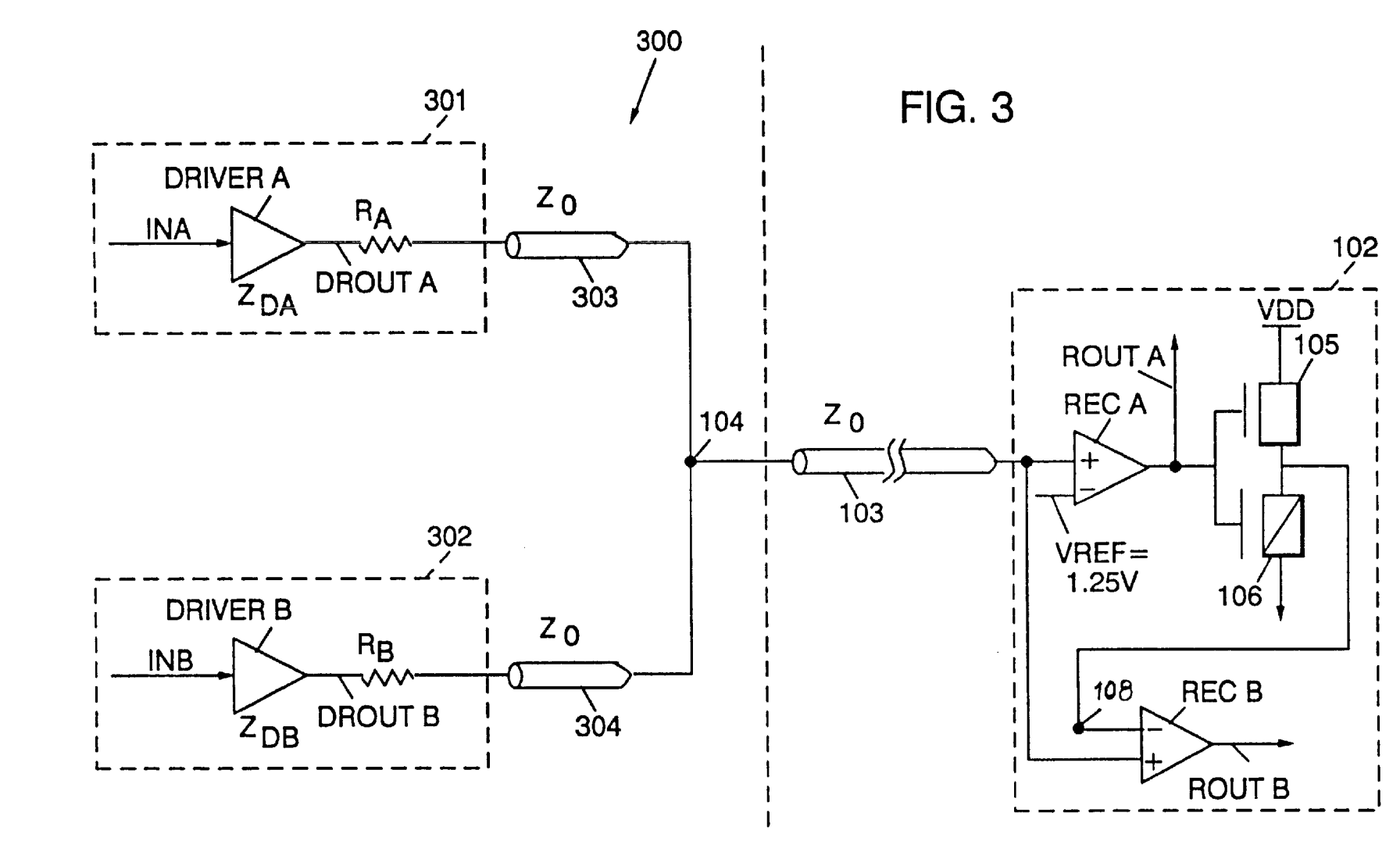
FIG. 3 illustrates an alternative embodiment of the present invention wherein two drivers on two separate chips communicate with two receivers on the same chip simultaneously.

Referring next to FIG. 3, there is illustrated the situation where the circuitry embodied within chip 101 of FIG. 1 is replaced by circuitry 300, wherein Driver A and resistor $R_A$ are implemented within chip 301, while Driver B and resistor $R_B$ are implemented within chip 302. As a result of this implementation, it is necessary to include transmission line 303 having an impedance of $Z_0$ in order to couple chip 301 to transmission line 103, and it is necessary to include transmission line 304 having an impedance of $Z_0$ to couple transmission line 103 to chip 302. This alternative embodiment operates in a similar manner as that illustrated in FIG. 1 and described with reference to Table 1. Preferably, $Z_{DA}$, $R_A$, $Z_{DB}$, and $R_B$ are chosen such that: $(Z_{DA}+R_A)//(Z_{DB}+R_B$ of transmission line 304)=$Z_0$ of transmission line 103, and $(Z_{DA}+R_A)/(Z_{DB}+R_B)=½$ (approximately).

Figure 4:
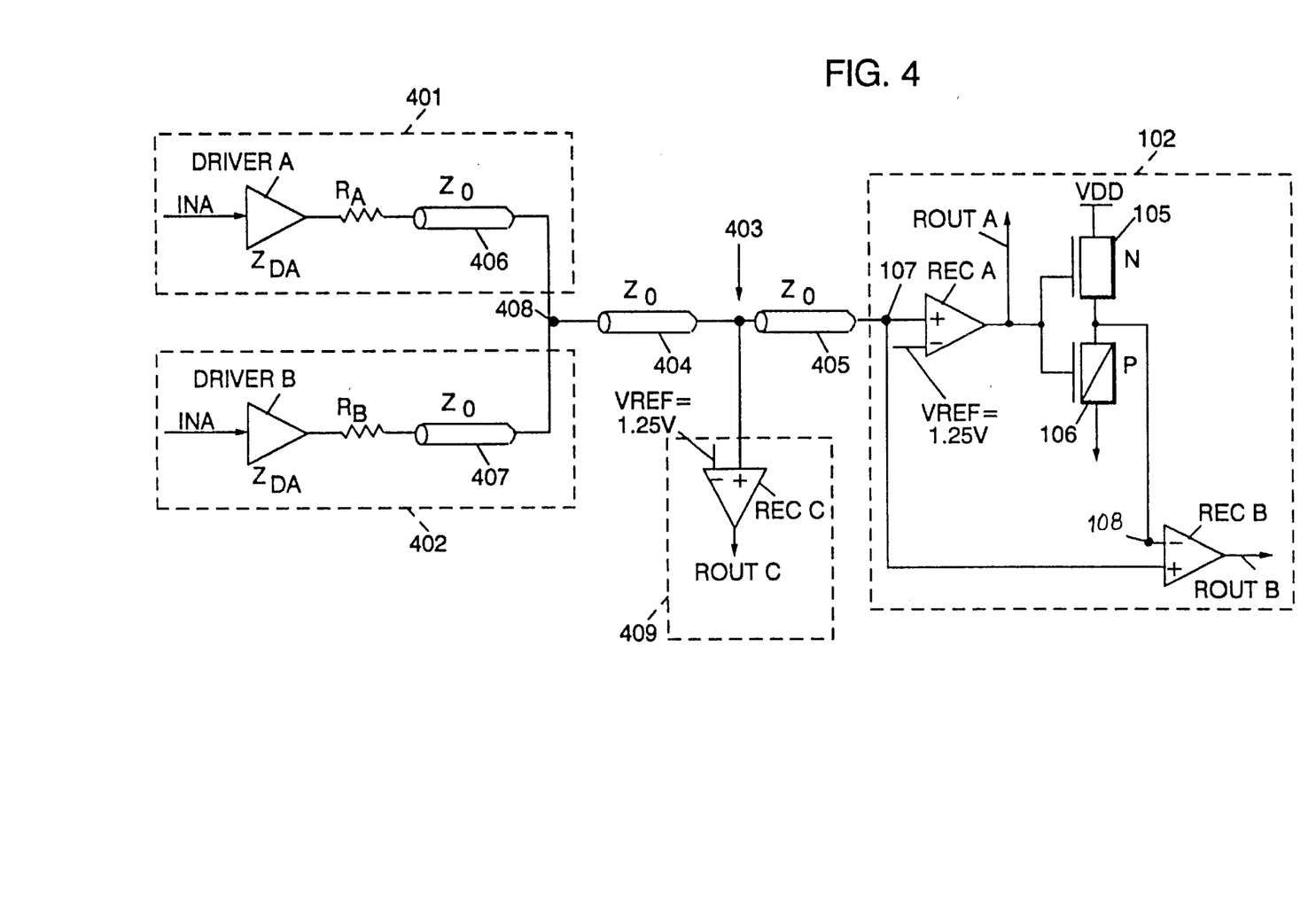
FIG. 4 illustrates an alternative embodiment of the present invention wherein two drivers on two different chips communicate with two receivers on one chip and a receiver on another chip.

Referring next to FIG. 4, there is illustrated a situation where digital signal A is driven from chip 401, while digital signal B is driven from a separate and different chip 402 to common node 408, which is coupled via transmission line 404 and transmission line 405 to chip 102. Chip 102 is the same as that described with respect to FIG. 1. Furthermore, at node 403, chip 409 is coupled in order to also receive digital signals A and B. As above, it is desirable that the parallel combination of the impedances of chips 401 and 402 match the impedances of transmission lines 404 and 405. However, it has been shown by experimental use that such matching is not necessary for a proper operation of the circuitry illustrated in FIG. 4.

Again, as above, digital signal A is driven by Driver A to node 408 and digital gnal B is driven by Driver B to node 40. Digital signals A and B are transmitted via transmission lines 404 and 405 to chip 102 in a similar manner as described above with respect to FIG. 1 and Table 1. The encoding and decoding discussed in conjunction with FIG. 1 also applies to FIG. 4.

Additionally, digital signal A may be supplied and decoded to output line ROUTC in chip 409. ROUTC is supplied through Receiver C, which is essentially identical to Receiver A. Thus, as can be seen by the illustration in FIG. 4, digital signal A may be accessed at both output lines ROUTA and ROUTC. Similarly, though not shown in FIG. 4, chip 409 may include identical circuitry as illustrated in chip 102, thus permitting a decoding of digital signal B in the same fashion as supplied at output line ROUTB in chip 102.

Figure 5:
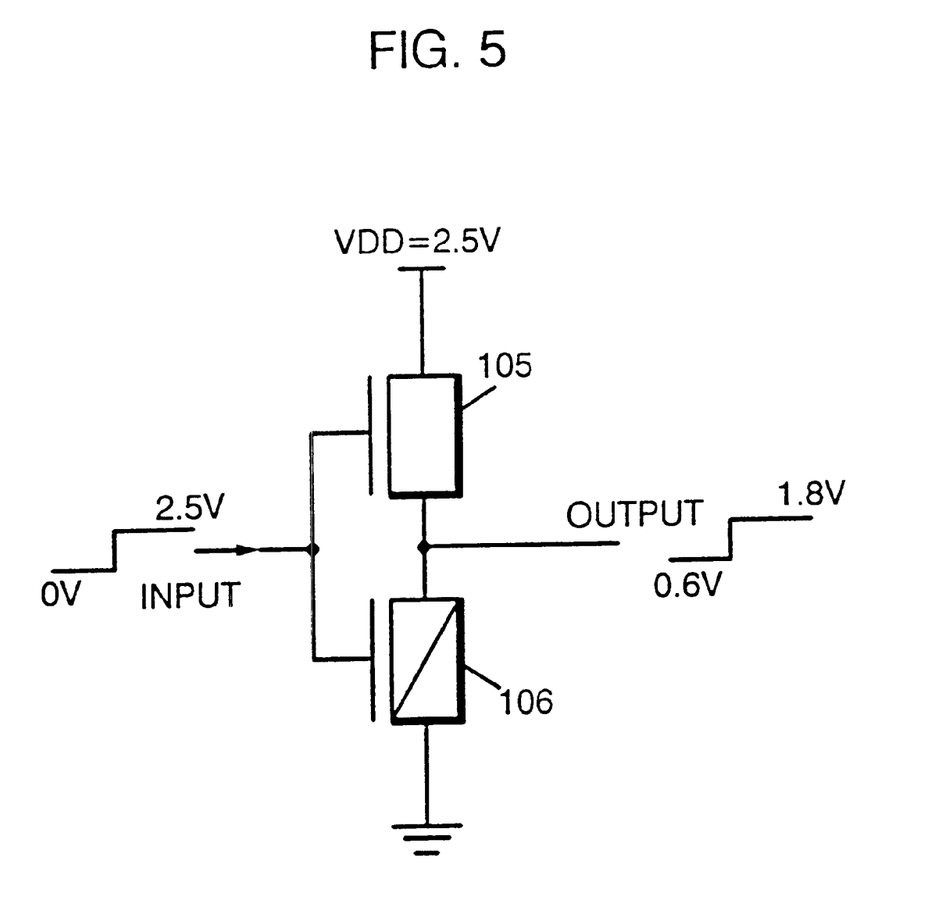
FIG. 5 illustrates a buffer circuit used in the present invention.

Referring next to FIG. 5, there is illustrated the low voltage non-inverting buffer utilized in chip 102. When an input of 0 volts is applied to the buffer circuit, the output will be approximately 0.6 volts. If an input of 2.5 volts is applied, the output will be approximately 1.8 volts.

Although the present invention and its advantages have been described in detail, it should be understood that various changes, substitutions and alterations can be made herein without departing from the spirit and scope of the invention as defined by the appended claims.

What is claimed is:

1. A system for simultaneously transmitting first and second data signals between first and second circuits via a single transmission path, said system comprising:

circuitry for receiving said first data signal;

circuitry for receiving said second data signal;

circuitry, coupled to said circuitry for receiving said first data signal and said circuitry for receiving said second data signal, for encoding said first and second data signals into a single encoded signal, wherein said single encoded signal is provided along said single transmission path;

circuitry, coupled to said single transmission path, for decoding said single encoded signal into said first data signal; and circuitry, coupled to said single transmission path, for decoding said single encoded signal into said second data signal, wherein said single encoded signal provided along said single transmission path is not created by time division multiplexing said first and second data signals.

2. The system as recited in claim 1, wherein said first and second data signals may each take on one of two voltage levels, and wherein said single encoded signal takes on one of four voltage levels.

3. The system as recited in claim 2, wherein impedances of said circuitry for receiving said first data signal and said circuitry for receiving said second data signal are preselected in order to produce said single encoded signal at one of said four voltage levels upon receipt of a certain combination of said two voltage levels.

4. The system as recited in claim 3, wherein said encoding circuitry comprises:

a first driver coupled to said circuitry for receiving said first data signal;

a first resistor coupled in series between said first driver and said single transmission path;

a second driver coupled to said circuitry for receiving said second data signal; and a second resistor coupled in series between said second driver and said single transmission path.

5. The system as recited in claim 1, wherein said circuitry for decoding said single encoded signal into said first data signal comprises a first differential receiver having one input coupled to said single transmission path and a second input coupled to a reference signal.

6. The system as recited in claim 1, wherein said circuitry for decoding said single encoded signal into said second data signal utilizes said first data signal in order to decode said single encoded signal into said second data signal.

7. The system as recited in claim 6, wherein said first data signal is supplied by said circuitry for decoding said single encoded signal into said first data signal.

8. The system as recited in claim 6, wherein said first data signal is supplied by said circuitry for receiving said first data signal.

9. A system for simultaneously transmitting first and second data signals between first and second circuits via a single transmission path, said system comprising:

circuitry for receiving said first data signal;

circuitry for receiving said second data signal;

circuitry, coupled to said circuitry for receiving said first data signal and said circuitry for receiving said second data signal, for encodino said first and second data signals into a single encoded signal, wherein said single encoded signal is provided along said single transmission path;

circuitry, coupled to said single transmission path, for decoding said single encoded signal into said first data signal; and circuitry, coupled to said single transmission path, for decoding said single encoded signal into said second data signal, wherein said circuitry for decoding said single encoded signal into said second data signal utilizes said first data signal in order to decode said single encoded signal into said second data signal, wherein said circuitry for decoding said single encoded signal into said second data signal further comprises:

a buffer circuit having its input receiving said first data signal; and a differential receiver having one input coupled to an output of said buffer circuit and a second input coupled to said single transmission path.

10. The system as recited in claim 1, wherein said circuitry for receiving said first data signal, said circuitry for receiving said second data signal, and said circuitry for encoding said first and second data signals into said single encoded signal are implemented on a first integrated circuit chip, while said circuitry for decoding said single encoded signal into said first data signal, and said circuitry for decoding said single encoded signal into said second data signal are implemented on a second integrated circuit chip, wherein said single transmission path is coupled between said first integrated circuit chip and said second integrated circuit chip.

11. The system as recited in claim 1, wherein said circuitry for receiving said first data signal and a first portion of said circuitry for encoding said first and second data signals into said single encoded signal are implemented on a first integrated circuit chip, while said circuitry for receiving said second data signal and a second portion of said circuitry for encoding said first and second data signals into said single encoded signal are implemented on a second integrated circuit chip.

12. The system as recited in claim 1, further comprising:

second circuitry, coupled to said single transmission path, for decoding said single encoded signal into said first data signal.

13. The system as recited in claim 1, further comprising:

second circuitry, coupled to said single transmission path, for decoding said single encoded signal into said second data signal.

14. The system as recited in claim 1, wherein said circuitry for receiving said first data signal and a first portion of said circuitry for encoding said first and second data signals into said single encoded signal are implemented on a first integrated circuit chip, while said circuitry for receiving said second data signal and a second portion of said circuitry for encoding said first and second data signals into said single encoded signal are implemented on a second integrated circuit chip, wherein said circuitry for decoding said single encoded signal into said first data signal is implemented on said second integrated circuit chip, while said circuitry for decoding said single encoded signal into said second data signal is implemented on said first integrated circuit chip.

15. The system as recited in claim 12, wherein said first and second circuitry for decoding said single encoded signal comprise separate differential receivers each having one input coupled to said single transmission path, and wherein said first data signals outputted from each of said differential receivers are separate signals.

16. The system as recited in claim 9, wherein said single encoded signal provided along said single transmission path is not created by time division multiplexing said first and second data signals.

17. The system as recited in claim 12, wherein said second decoding circuitry may be connected to said single transmission path at any location along said single transmission path.

* * * * *

UNITED STATES PATENT AND TRADEMARK OFFICE
CERTIFICATE OF CORRECTION

PATENT NO.   : 6,337,884 B1
DATED        : January 8, 2002
INVENTOR(S)  : Tai Cao, Satyajit Dutta, Thai Quoc Nguyen, Thanh Doan Trinh and Lloyd Andre Walls It is certified that error appears in the above-identified patent and that said Letters Patent is hereby corrected as shown below:

Column 4,
Table 1, move the first "XLINE" to a column heading even with "CHIP 101" and "CHIP 102"

Column 6,
Line 39, replace "gnal" with -- signal --.

Column 7,
Line 59, replace "encodino" with -- encoding --.

Signed and Sealed this

Twenty-seventh Day of August, 2002

Attest:

Attesting Officer

JAMES E. ROGAN
Director of the United States Patent and Trademark Office